U S005293595A

United States Patent [19]
Caldarale et al.

[11] Patent Number: 5,293,595
[45] Date of Patent: Mar. 8, 1994

[54] PAGING SYSTEM USING EXTENSION TABLES FOR CONFLICT RESOLUTION

[75] Inventors: Charles R. Caldarale, Minneapolis; Klaus G. Dudda, deceased, late of Roseville, by Sabine U. Dudda, Legal Representative; Peter J. Hancock, White Bear Lake, all of Minn.

[73] Assignee: Unisys Corporation, Blue Bell, Pa.

[21] Appl. No.: 628,056

[22] Filed: Dec. 17, 1990

[51] Int. Cl.⁵ .................. G06F 12/00; G06F 12/10; G06F 15/40

[52] U.S. Cl. .................................. 395/400; 395/600

[58] Field of Search ..................... 395/400, 425, 600

[56] References Cited

U.S. PATENT DOCUMENTS

| | | | |
|---|---|---|---|
| 4,215,402 | 7/1980 | Mitchell et al. | 395/400 |
| 4,430,701 | 2/1984 | Christian et al. | 395/400 |
| 4,468,728 | 8/1984 | Wang | 395/600 |
| 4,611,272 | 9/1986 | Lomet | 395/600 |
| 4,914,577 | 4/1990 | Stewart et al. | 395/400 |
| 5,129,074 | 7/1992 | Kikuchi et al. | 395/425 |
| 5,202,986 | 4/1993 | Nickel | 395/600 |

FOREIGN PATENT DOCUMENTS

010195 9/1978 Fed. Rep. of Germany .

OTHER PUBLICATIONS

William Kent, "A Simple Guide to Five Normal Forms in Relational Database Theory," *Communications of the ACM*, Feb. 1983, vol. 26, pp. 120–125.

Ted G. Lewis and Curtis R. Cook, "Hashing for Dynamic and Static Internal Tables," *IEEE*, Oct. 1988, pp. 45–56.

Fagin et al, "Extendible Hashing-A Fast Access Method for Dynamic Files:, ACM Transactions on Database Systems", vol. 4, No. 3 pp. 315-344.

Proceedings of First International Conference on Supercomputing Systems, 16 Dec. 1985, Washington, IEEE Com Soc Press, pp. 697-705.

Thakkar et al., "Virtual Address Translation Using Parallel Hashing Hardware," pp. 701-702.

*Primary Examiner*—Alyssa H. Bowler
*Assistant Examiner*—Michael A. Whitfield
*Attorney, Agent, or Firm*—Glenn W. Bowen; Mark T. Starr

[57] ABSTRACT

A method of resolving conflicts when the index values of different binary bit designators are found to be equal is provided which is implementable in a virtual memory to real memory address translation scheme and alternately in a data base environment. Binary bit designators are used, each of which consists of a first compare segment, a second index segment and a third offset segment. When two indexes are found to be identical, similar groups of bits in the first segment are considered as subsidiary indexes and are utilized in sequence until all of the bits of said first segments have been used. Each time an index operation occurs a new table entry in a new table is identified, until a group of bits from the first segments of the different binary bit designators are found to be unequal. When this occurs, comparisons of the final table entries in the final table are undertaken to determine if each stored value in each final table entry is equal to the value represented by the associated first segment.

4 Claims, 3 Drawing Sheets

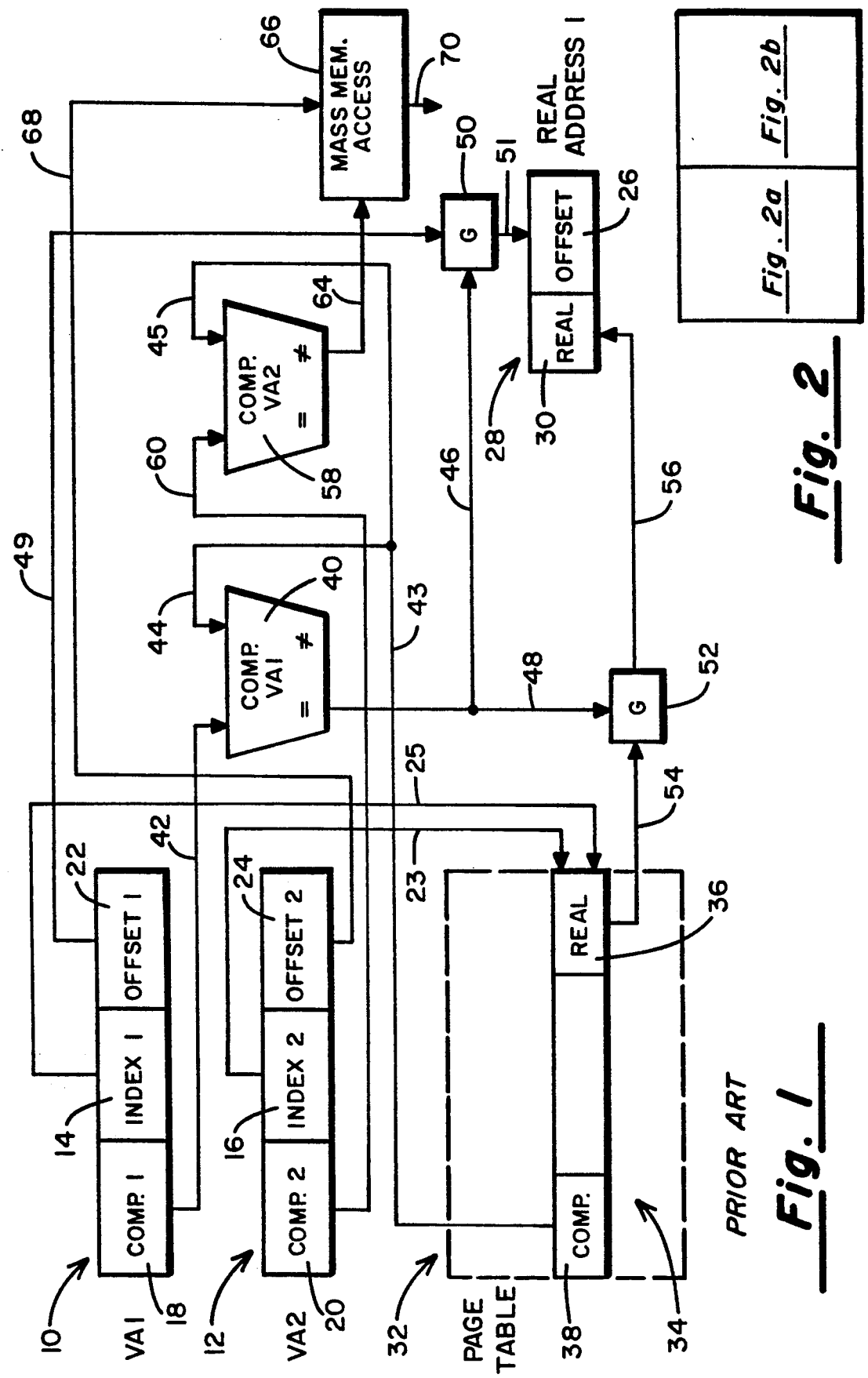

PAGING SYSTEM USING EXTENSION TABLES FOR CONFLICT RESOLUTION

BACKGROUND OF THE INVENTION

1. Field of the Invention

The present invention is related to the resolution of collisions when hashing techniques are used to search and retrieve data from memory in a data processing system. More specifically, the invention is particularly useful for the resolution of page table collisions during the translation of a virtual address to a real address in a data processing system.

2. Description of the Background Art

Techniques which efficiently store, search and retrieve information are crucial for modern day data processing systems, particularly in large main frame systems. Hashing is commonly utilized to obtain information from records in a data base where each record is partitioned into a key portion and a data portion. The key portion is used to manage operations which utilize the record for retrieval, modification and maintenance functions. A description of existing techniques for hashing may be found in the survey and tutorial series of the IEEE publication *Computer*, October 1988, which is entitled "Hashing for Dynamic and Static Internal Tables" by Ted G. Lewis and Curtis R. Cook, pages 45-56.

The design of records which utilize key fields is described in the article entitled "A Simple Guide to Five Normal Forms in Relational Database Theory" by William Kent in the *Communications of the ACM*, February 1983, Vol. 26, No. 2, pp 120-125. This article provides insight into the selection of a key relative to the information that is contained in the record in order to provide for efficient update and to prevent data inconsistency.

As software systems become more and more complex, there is an increasing demand for more storage. Virtual storage systems are able to satisfy this demand in a manner which is transparent to the user who may regard all the storage space as addressable main storage due to the mapping of virtual addresses into real addresses. In such systems the size of the virtual storage is limited by the addressing scheme of the computer system and the amount of auxiliary storage available, and not by the number of main storage locations. The translation of virtual addresses into physical addresses that can be used to access memory is accomplished by dividing the virtual addressing space into fixed size segments referred to as "pages", which are analogous to the data portions of the records in a data base. The virtual address space is divided into pages, and page table entries are used to designate those pages which are currently resident in main, or real, memory. The classical method of accomplishing this is to select part of the virtual address as an index. Another portion of the virtual address is selected as a comparison segment. The remaining bits of the virtual address then serve as the in-page, or offset, address into the page. The combined index and comparison portions of the virtual address are analogous to the key portion of a record in a data base system.

In order to map a very large number of words of virtual space to real memory, a direct page table would be infeasibly large. (For example, $2^{54}$ words of virtual space, using $2^{12}$ word pages, would have to have $2^{42}$ entries, regardless of real memory size.) An approach taken in the past has been to have a page table entry only for those pages which are resident in real memory, which limits the number of page table entries to a reasonable number. The problem is still presented as to how to access the page table entries for a given virtual address. This has been accomplished by allowing a number of least significant bits (for example, 12) to be used as the offset into the page and to use the next N significant bits to index into the page table. When used in this fashion, the operation is referred to as "hashing", and the page table is also termed a hash table. The entries into the hash table initiate a number of chains of page table entries all of which have the same value of N bits. Each of the entries contains the remaining bits of the virtual address that it represents, and the value of N is determined by the hardware and software that is utilized to implement the algorithm.

In operation of this system, the instruction processor goes to the hash entry that is specified by these N bits and locates a chain of all pages whose virtual addresses include the same value of the N bits. The instruction processor then progresses through the chain from one page entry to the next, and at each entry compares the comparison portion of the virtual address to be located with a stored comparison portion of the page table entry until a match is obtained. Once a match is obtained, the real page address is retrieved from the entry, and then concatenated with the page offset to form the complete real address. In the event that the instruction processor does not find a match in the chain, (i.e., there is is no entry containing the value of the comparison portion), the page is not resident in real memory. Paging translation methods of the prior art that utilize the above-described chaining techniques are slow and have a detrimental impact on the performance of the system. In addition, there may be undesirable variations in system performance depending on the length of the chains.

The more detailed description of the prior art techniques with reference to FIG. 1 which follows is included with the intention of more distinctly defining the present invention over such prior art techniques. Paging techniques have been utilized to access memory in virtual memory systems through the use of key fields. For example, referring to FIG. 1, in such systems virtual address requests 10, 12 may be used to map large virtual addresses into comparatively small real address space. This is accomplished by dividing the virtual addresses into compare, index (or key), and offset segments. The index, or key, portions 14, 16 of the virtual addresses 10, 12 are used to reference memory locations in a page table 32. The compare portions 18, 20 of the virtual addresses 10, 12 represent values, each of which may be associated with a number of page table entries. The page offsets 22, 24 of the virtual addresses 10, 12 represent the offset location of the requested address in a page, which may be utilized along with an appropriate real page address 36 to obtain a real address 28. Since only the index portions 14, 16 of the virtual addresses 10, 12 are utilized to select page table entry 34, auxiliary techniques must be employed to resolve conflicts among non-unique index portions in a paged virtual memory system of the described type. One such technique previously mentioned is the chaining method.

When prior art virtual memory systems incorporate tables, such as the page table 32, the value of the index 14 of the virtual address 10 is used to locate the desired page table entry 34 in the page table 32. The page table entry 32 includes a specified real page address 36 and a compare segment 38. A second virtual address 12 can also be used to locate a second entry in the same page table 32, wherein its index value 16 may be the same as index value 14, providing there is no conflict between the values of the compare segments 18 and 20. FIG. 1 illustrates a prior art implementation in which index 14 and index 16 both point to the same page table entry 34. Because of this possibility of encountering non-unique index values, it is necessary to look at the compare portion 38 of the page table entry 34, and to compare this with the compare portions 18, 20 of the virtual addresses 10 and 12, respectively. Although FIG. 1 implies that this comparison takes place in a simultaneous manner, sequential comparison of the compare segment 18 with the compare segment 38, either followed, or preceded, by comparison of the compare segment 20 with the compare segment 38, is consistent with prior art implementations. This comparison may be achieved by use of either a hardware comparator, or through a software algorithm, either of which may be achieved in various ways now known to those skilled in the art. It is assumed in this description that a comparison match occurs between the compare segment 18 and compare segment 38, but that no match occurs between the compare segment 20 and the compare segment 38.

The values of compare segment 18 of virtual address 10 and of the compare segment 38 of the page table entry 34 are coupled to a comparison device, or step, 40, as represented by the line 42 and the lines 43, 44. In a hardware implementation, these lines each represent signal-carrying data lines. In a software implementation, they represent program data flow. The comparison check provided by the comparison device or step 40 thus indicates a match on the lines 46, 48, which are coupled to enable the enabling gates, or steps, 50, 52, respectively, which may be achieved through either hardware or software implementation.

If the compare segments 18 and 38 are equal, the enabling gate 50 couples the offset segment 22 of the virtual address 10, as indicated by the lines 49 and 51, to serve as the least significant bits, or offset 26 of the real address 28. Likewise, the real page address 36 of the page table entry 34 is coupled, as represented by the lines 54 and 56 through the gate 52, to serve as the most significant bits portion 30 of the real address 28. The real page address 30 is combined with the offset portion 26 to form the total real address 28.

The comparison device, or step, 58, as the case may be according to whether implementation is accomplished through hardware or software, represents a comparison of the compare segment 20 of the virtual address 12, with the compare segment 38 of the page table entry 34. The values of the compare segment 20 and of the compare segment 38 are coupled to the comparison device, or step, 58 for such comparison as represented by the line 60 and the lines 43, 45. The lines 60, 43, 45, like the lines 42, 43, 45, may represent either data lines or program data flow according to whether a hardware or software implementation is undertaken. In the illustrated embodiment, it is assumed that although index 14 and index 16 are equal, the values in compare segments 18 and 20 are not. Since the page table can contain only one page table entry which has a given index value, the page table entry 34 corresponds only to virtual address 10 and not to virtual address 12. This being the case, the comparison device, or step, 58 will indicate that there is no comparison for virtual address 12, and, as indicated by the output on the line 64 to the mass memory access 66, it will then be necessary to obtain the contents of virtual address 12 from mass storage since it will not be resident in the main memory. The complete virtual address 12 is supplied, as indicated by the line 68, to active mass memory access 66 so that it may be used to supply, as indicated by the line 70, data stored at the desired location in backup storage, since in the illustrated embodiment it is assumed that the compare segment 20 does not match the compare segment 38.

In other words, FIG. 1 does not illustrate the conflict case where both virtual addresses 10, 12 are present in main memory. If both of the virtual addresses are present in main memory, a conflict mechanism must be called to resolve the ambiguity. As previously noted, this is typically accomplished by searching an extended chain of page table entries, each of which point to another element in the chain, until the search terminates either by locating the desired real address, or by providing a "page fault" that indicates that the virtual address is not resident in main memory. The present invention is directed to an alternate conflict resolution mechanism which can determine page faults and resolve paging conflicts in a more efficient manner by guiding the search to a predictable number of memory references without penalizing non-conflict cases.

SUMMARY OF THE INVENTION

The present invention is directed to the translation of a computer's virtual address into a real address in which locating the corresponding page table entry, which defines a page of memory, is accelerated when there are page table collisions by the use of a hierarchical look-up mechanism that utilizes page tables that are dynamically expanded or contracted as page address collisions are detected. Alternately, the conflict resolution technique may be used to select data base objects from a data base.

BRIEF DESCRIPTION OF THE DRAWINGS

The present invention is illustrated by reference to drawings in which:

FIG. 1 is a block diagram illustration of a virtual address to a real address translation system which does not illustrate collision resolution, but which might be used with the prior art chaining collision resolution technique described herein;

FIG. 2 is a map which shows the placement of FIGS. 2a and 2b required to provide FIG. 2.

DETAILED DESCRIPTION OF THE INVENTION

A Virtual Memory Embodiment of the Invention

The present invention provides a way of obtaining conflict resolution in virtual memory paging systems, or for data base systems using hashing techniques. It is preferably implemented using hardware and software trade-offs in the manner known to those skilled in the art, in order to optimize the use of the invention for each particular machine in which it is used.

Figure 2A:
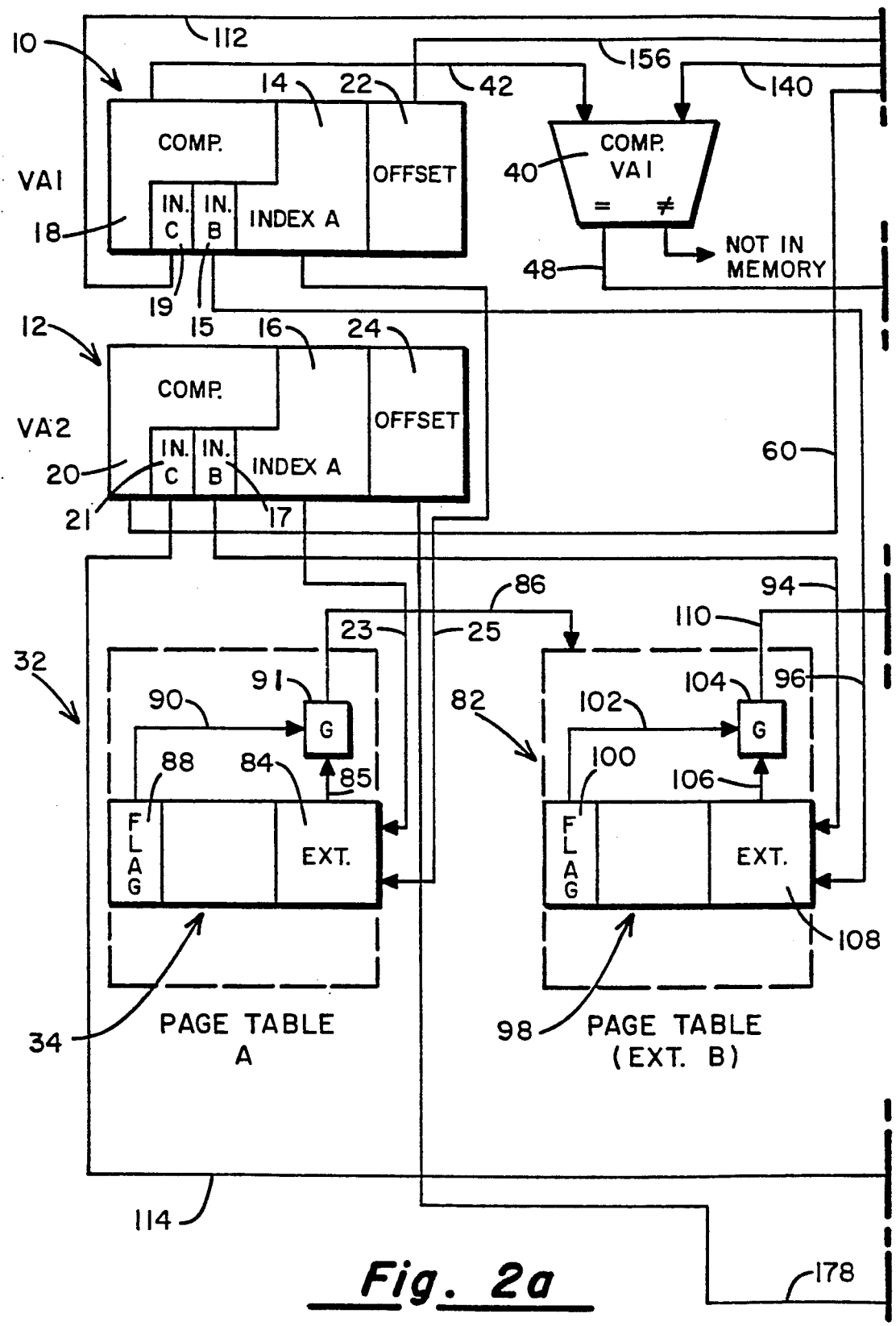
FIGS. 2a and 2b are a block diagram that illustrates that collision resolution in accordance with the present invention, which may occur in the translation of a virtual address to a real address, or in locating a record in a data base storage system.
Figure 2B:
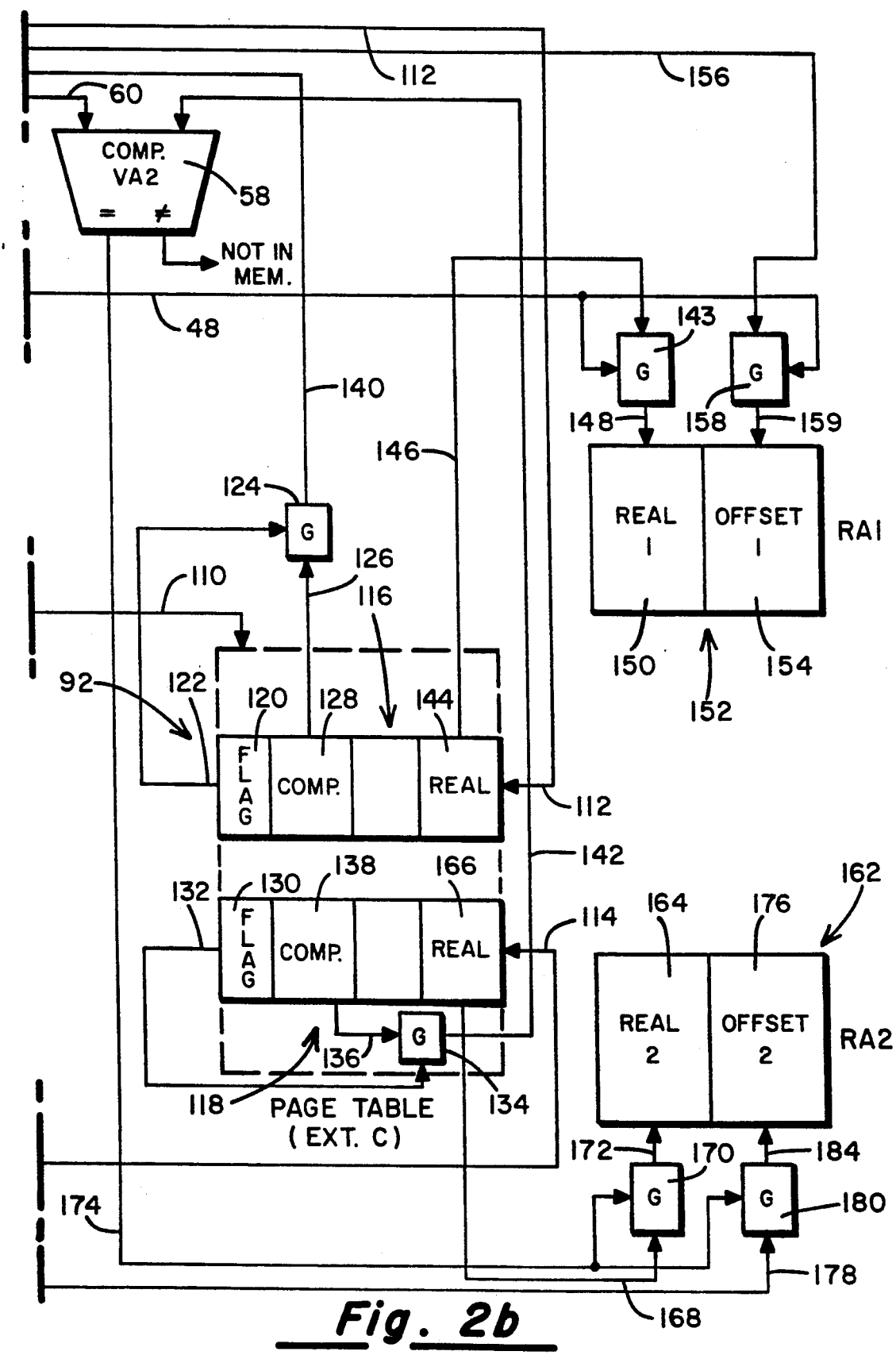

The virtual memory addressing embodiment of the invention is illustrated in FIGS. 2a and 2b wherein, and to the extent that there is similarity between the elements of FIGS. 1 and 2a and 2b, the same element designations that were used to describe FIG. 1 are utilized to illustrate FIGS. 2a and 2b. In FIGS. 2a and 2b it is assumed that there are two levels of index conflict although the invention may be utilized for any number of conflict levels.

In the embodiment of the invention illustrated in FIGS. 2a and 2b there are two virtual address 10, 12 which have index portions 14, 16, comparison portions 18, 20 and offset portions 22, 24. The index portions 14, 16 are illustrated as overlapping the comparison portions 18, 20, which means that some bits may form part of both the compare and the index portions, or they may be adjacent and non-overlapping. Also illustrated in FIGS. 2a and 2b are sub-index sections 15, 17, which may be dynamically selected by borrowing preselected bits from the compare portions 18, 20, respectively, for use in the event that there is an index conflict between indexes 14, 16. In the event that there is a further conflict between indexes 15, 17, the index portions 19, 21 which may also be dynamically selected can be used to further extend the implementation of the present invention, in a manner which is described herein.

As in FIG. 1, there is a first page table 32 which is designated as Page Table A in FIG. 2. When there is no conflict of the index portions 14, 16 of requested virtual addresses, or one of the virtual addresses is not resident in main memory, the system operates as described in connection with FIG. 1. A first additional page table 82 (extension B) is employed, however, when there is conflict between the index 14 and the index 16. A second additional page table 92 (extension C) is generated when conflict still exists between the expanded index 15 and index 17. It is assumed, as in the previous illustration of the prior art, that index 14 and index 16 both point to the same page table entry 34. In the present invention, however, upon conflict at the page table 32 level, an extension value 84 in the table 32 that is pointed to by indexes 14, 16 itself points to the Extension B page table 82, as indicated by the line 86. Thus, the page table entry 34 does not contain a usable compare segment when conflict occurs. Instead, the extension 84 is used to point to the page table 82, which may be dynamically created or destroyed as required by the need to resolve page table conflicts. This is achieved by use of an extension flag 88 which, as indicated by the line 90, is coupled to an enabling gate 91 that, as indicated by lines 85, 86, enables the extension value 84 of the page table entry 34 to be used to point to the second page table 82.

Because of the occurrence of this first conflict between indexes 14, 16, additional index portions 15, 17 are required to attempt to resolve the conflict. These additional bits are provided by utilizing a number of the bits of the comparison portions 18, 20 adjacent to the most significant bits of index portions 14, 16, respectively.

In the illustrated version of FIGS. 2a and 2b, it is assumed that the first set of generated indexes 15, 17 also are identical, and, as indicated by the lines 94, 96, select the same page table entry 98 in the page table 82. Since the number of bits in the index portions 15, 17 may be less than those in the index portions 14, 16, therefore, table 82 and subsequent tables, such as table 92, may be smaller than table 32. Page table entry 98 provides an extension flag 100, which, as indicated by the line 102 to the enabling gate 104, signals, as indicated by the line 106, that the extension value 108 of the page table entry 98 is to be used. The extension value 108 is supplied, as indicated by the line 110, as a pointer to the extension C page table 92, which may be dynamically created and destroyed as required by techniques known to those skilled in this art.

Due to the existing conflict at this level, indexes 19, 21 are next generated by utilizing a number of bits that are adjacent to the most significant bits of sub-index sections 15, 17. The number of page table extensions that may be generated are, of course, eventually limited by the total number of bits of the virtual address that are more significant than those found in the index portions 14, 16.

In the illustrated example of the invention of FIGS. 2a and 2b, it is assumed that the next group of expanded indexes 19, 21 no longer point to the same page table entry, as indicated by the lines 112, 114 which point to different page table entries 116, 118 in the page table extension 92. This being the case, a page table comparison flag 120 is set which is supplied, as indicted by the line 122, to an enabling gate 124, so that an enable is provided, as indicated by the line 126, that allows the comparison value 128 of page table entry 116 to be supplied via line 140 to the comparison device, or step, 40. In a similar manner, the comparison flag 130, as indicated by line 132, is supplied to the enabling gate 134, and, as indicated by the line 136, it allows the comparison value 138 of page table entry 118 to be supplied via line 142 to the comparison device, or step, 58. The lines 126, 136 represent the initiation of the transfer, as indicated by the lines 140 and 142 from the comparison values 128, 138 to the respective comparison devices, or steps, 40, 58.

A comparison is made at the comparison device, or step, 40 of the comparison value 18 of virtual address 10 with the corresponding comparison value 128 of page table entry 116. The comparison value 20 is also compared with the comparison value 138 of the page table entry 118 at the comparison device, or step, 58. Since the page table 92 now contains entries for both comparison values, the comparison device, or step, 40 will supply the enabling gate 143, as indicated by the line 48, with the real page address value 144 from the page table entry 116. This value is then supplied, as indicated by the line 148, to form the most significant bits real page address portion 150 of the real address 152. The offset value 154 of the real address 152 is provided from the offset portion 22, as indicated by the lines 156, 159 and the enabling gate 158, which is enabled by the comparison device or step 40, as indicated by the line 48. The offset portion 22 is thereby supplied directly to provide the offset value 154 of the real address 152. In a similar manner, the page table entry 118 will cause the real page address segment 166 of the page table entry 118, to be supplied through the enabling gate 170, as indicated by the lines 168 and 172, which gate is enabled by a match indication from the comparison device or step 58, as indicated by the line 174. The offset 176 of the real address 162 is thereby provided from the offset portion 24 of the virtual address 12, as indicated by the lines 178, 184 via the enabling gate 180, which is enabled by the comparison device or step 58, as indicated by the line 174.

If either of the comparison values 128 or 138 of the compare table entries 116, 118, respectively, fail to match the corresponding compare segments 18, 20, respectively, then the requested real address is not resident in main memory for that particular virtual address and the data must be acquired from mass memory backup storage.

A Data Base Hashing Adaptation of the Present Invention

Conflicts that arise during data base searches may be resolved by an adaptation of the present invention to this embodiment. The concepts described above in relation to the description of FIGS. 2a and 2b also apply to this version. The implementation of this embodiment is described by assuming a particular type of record for illustrative purposes. Other forms of data base records, including, but not limited to, those documented in the aforementioned article by William Kent, may be substituted in a manner that will be apparent to those skilled in the art. The following example is intended to be illustrative of the present invention in a concise manner, and not of data base design techniques, since these will be apparent to those skilled in the art. The described system implementation of the virtual memory addressing embodiment is also applicable to this embodiment.

As an illustrative example, it is assumed that a data base consists of a student's name and class rank in various subjects and provides a class grade based on class rankings and other stored information. This particular type of record may be translated directly into the invention by equating the following:

| Compare portion | student's name |
|---|---|
| Index portion | subject |
| Offset portion | class rank |
| Real address | stored information about a student |

In this example, the compare and index portions are assumed to be adjacent rather than overlapping.

Analogous terms of the data base record may be directly related to the virtual address selection schemes of FIGS. 2a and 2b, as may be seen by reference to the following two records:

| COMPARE | INDEX | OFFSET |
|---|---|---|
| BROWN | ENGLISH | 16 |
| GREEN | ENGLISH | 21 |

If the portion of the record that specifies ENGLISH is used as the index in the implementation of FIGS. 2a and 2b, it is seen that conflict occurs at the first level and an extension table 82 must be generated. The digital value of the word ENGLISH may select a table entry 34 which will contain the extension portion 84 that points to the table 82.

It may now be assumed that the indexes may be expanded so that the last letter from the student names BROWN and GREEN are used as expanded or supplemental index values. In this case a second conflict will occur and the use of page table 92 is necessary to resolve the conflict. Using the next set of letters, "W", for example, from BROWN and "E" from GREEN results in non-conflicting indexes at this level. When this occurs the compare segments "BROWN" and "GREEN" may be used to access different stored data base values associated with each student.

The final result from the data base may then utilize the offset, or class, ranks of the students in combination with the unique stored values that are returned for each student, and are analogous to the real page address values 144, 166 of a virtual address system, to form a value that combines class rank with other stored information about each student.

It is to be understood that the foregoing described invention may be incorporated into many variations and implementations that will be evident to those skilled in the art without departing form the spirit and scope of the claims appended hereto. In particular, while the invention has been described with reference to a system using memory pages, it will be adaptable to other memory organizations which may use segmentation, a combination of segmentations and paging or other recognized memory assignment schemes by techniques well known to those skilled in the art.

It is claimed:

1. A process for resolving comparison conflicts in a memory search system when index values of different binary bit designators, which are representative of objects stored in memory at a defined hierarchical level, are compared, wherein said designators each comprise first, second and third segments, said first segments represent comparison values and said second segments represent said index values, comprising the steps of:
   a) using said second segment to point to a first table entry in a first table when a first flag in said first table entry indicates that said second segments of a plurality of designators point to an identical entry in said first table,
   b) using an extension value found in said first table entry to point to a second table,
   c) using a first group of corresponding bits selected from said first segments of said designators to point to a second entry in said second table,
   d) using, as necessary, an additional extension value found in said second table entry if a second flag indicates that said first group of bits of different designators point to an identical second entry of said second table, said second extension value pointing to an additional table,
   e) using, as necessary, additional flags, extension values, tables and groups of other corresponding bits of said designators in a sequential manner until at least one group of bits is found which does not provide an identical entry for a corresponding group of bits of different designators or until all of said bits of said first segments have been used and additional groups of other corresponding bits of said designators which are selected from said first segments,
   f) referencing a final table entry in a final table and retrieving stored comparison segments associated with each of said binary bit designtors when one of said flags indicates that no identical entry is found for a particular group of bits of different designators,
   g) comparing said stored comparison segments with said first segments that are associated with the corresonding designators, and
   h) combining stored value segments which are resident in said final table entries with the binary bits of said third segments of said binary bit designators if the corresonding stored comparison segments match said first segments.

2. A process as claimed in claim 1 wherein said binary bit designators represent data base records.

3. A process as claimed in claim 1 wherein said binary bit designators represent virtual memory addresses, said stored value segments represent the most significant bit portions of real memory addresses and said third segments represent the least-significant bit portions of said real memory addresses.

4. A process as claimed in claim 3 wherein said virtual memory addrsses are memory page table addresses.

* * * * *